United States Patent [19]

Dollfus

[11] Patent Number: 4,854,178
[45] Date of Patent: Aug. 8, 1989

[54] FLOWMETER FOR DANGEROUS FLUIDS

[75] Inventor: Jacques Dollfus, Les Essarts le Roi, France

[73] Assignee: Société Anonyme: Societe Generale Pour les Techniques Nouvelles - SGN, France

[21] Appl. No.: 156,724

[22] Filed: Feb. 17, 1988

[30] Foreign Application Priority Data

Feb. 20, 1987 [FR] France .................. 87 02277

[51] Int. Cl.$^4$ ............................................. G01F 1/24
[52] U.S. Cl. ............................................. 73/861.58
[58] Field of Search .......... 73/861.47, 861.48, 861.52, 73/861.53, 861.58, 861.61

[56] References Cited

U.S. PATENT DOCUMENTS

| | | | |
|---|---|---|---|
| 3,182,501 | 5/1965 | Haase | 73/861.53 |
| 3,377,857 | 4/1968 | Moscarini | 73/861.53 |
| 4,212,200 | 7/1980 | Rousseau et al. | 73/861.52 |
| 4,297,899 | 11/1981 | Blaney et al. | 73/861.58 |

FOREIGN PATENT DOCUMENTS 1062443 7/1959 Fed. Rep. of Germany .
905502  5/1959 United Kingdom .

Primary Examiner—Herbert Goldstein
Attorney, Agent, or Firm—Louis Weinstein

[57] ABSTRACT

A flowmeter for dangerous fluids, using the deformation of a flexible metallic diaphragm under the effect of a pressure variation caused by the liquid flow, the flowmeter being placed under a protective plate and comprising a body of general cylindrical shape placed inside a bowl equipped with a lower inlet connection piece for introducing liquid into the bowl and an upper outlet connection piece for receiving liquid leaving the bowl, the body having a calibrated inlet orifice on its lower face, an outlet orifice in its upper lateral part, the metallic diaphragm being situated in said body at the upper interior part of the body above said upper connection piece, and a metallic segment for sealing the joinder between the body and the bowl, at a level situated between the inlet and outlet connection pieces and a hollow pin, joined to said diaphragm and having a lower end extending into the calibrated orifice, the pin having an outlet orifice situated above the metallic diaphragm, the upper end of said pin extending into a sensing device for providing a measurement of the displacement of the pin relative to the device, and hence the deformation of the metallic diaphragm.

19 Claims, 1 Drawing Sheet

FLOWMETER FOR DANGEROUS FLUIDS

FIELD OF THE INVENTION

The present invention relates to a flowmeter for dangerous liquids.

BACKGROUND OF THE INVENTION

Measuring of the rate of flow of a dangerous liquid flowing through a pipe system has become a difficult operation because of safety obligations.

For example, when working a radioactive liquid, it is important to avoid all possible risks of contamination through leaks of any sort. The measuring operations may be discontinued in testing cases or in cases of failure of the flowmeter, but the flow of liquid must imperatively be maintained without any leaks.

Many types of flowmeters external to the flowing circuit are known already, such as the Coriolis effects flowmeter and the electrical conductivity flowmeter.

The aforesaid requirements make it difficult to use most of the already known flowmeters (for example: vane deviation) because of the necessity of axes outlets, of connections, etc.

Completely external measuring principles exist, such as: by electrical conductivity, but these are not applicable to all liquids, by Coriolis effect, with a wide range of applications but an excessive sensitivity to external vibrations and the need to have the detection by direct contact with the conduits, without screening possibility, considerably shortens the working life. The radiations (beta and gamma) released by a strongly radioactive liquid rapidly destroy unprotected equipment.

SUMMARY OF THE INVENTION

The present invention relates to a flowmeter fixed on the conduits, run through by the liquid of which the rate of flow is to be measured, without any mechanical parts with shafts outputs, and such that any failure occurring in the flowmeter can have no effect on the flow of fluid. The worst that can happen, according to this invention, is that the measuring operation stops, but the liquid continues to flow. Another aspect of the invention is that the apparatus is so designed as to allow the operational part thereof to be extracted without any danger and without any interruption in the flow of liquid. In particular, the sensors giving the measurements can be replaced without the flow of liquid being interrupted and without the personnel who performs the replacement being exposed to radiation.

The principle applied in the measuring operation consists in causing a pressure drop in the liquid, in measuring said pressure drop by measuring the deformation of a diaphragm and in externally detecting the displacements of a magnetic mass joined to the diaphragm.

The invention therefore relates to a flowmeter for dangerous liquids, which uses the deformation, under the effect of a pressure variation caused by the flow of said liquid, of a deformable diaphragm, said flowmeter being placed under a protection plate, and being characterized in that:

it comprises a body of general cylindrical shape placed inside a bowl provided with a lower inlet connection piece and an upper outlet connection piece for the liquid, said body comprising on its lower face a calibrated orifice and in its lateral upper part, an outlet orifice, a metallic diaphragm being placed at the upper part of said body above said upper connection piece and a metallic segment ensuring tightness between said body and said bowl, at a level situated between said lower and upper connection pieces, it comprises a hollow pin, tightly joined to said diaphragm, which pin has a lower part projecting through said calibrated orifice and has an orifice situated above said metallic diaphragm, said hollow pin having an upper end extending into a device permitting the measurement of the displacement of said pin, hence the deformation of said metallic diaphragm.

The principle of the mechanical design consists in using an external bowl fixed on the conduits, in which bowl is placed the measuring device assembly, in such a way that it can be brought out through the top and through the protection plate. Said bowl, being fixedly mounted, ensures the continuity of the circuit.

BRIEF DESCRIPTION OF THE DRAWINGS

The invention will be more readily understood on reading the following description with reference to the accompanying drawings in which.

DETAILED DESCRIPTION OF THE INVENTION

Figure 1:
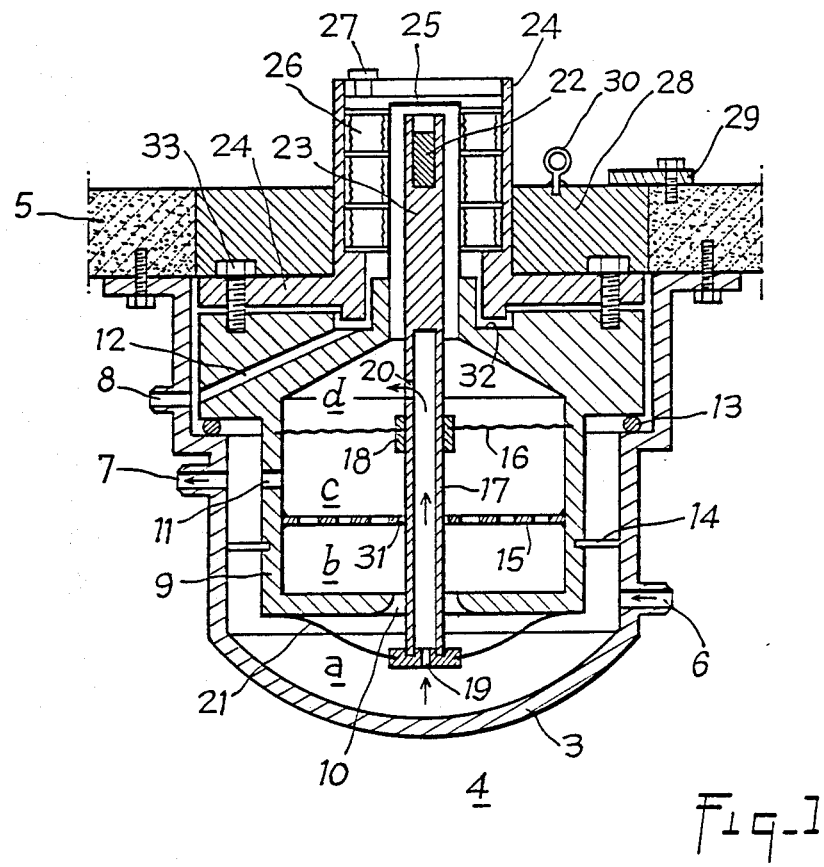
FIG. 1 is an axial section of a flowmeter fitted under a plate inside a cell. The plate is horizontal, and the flowmeter axis is vertical. The marked zone is therefore the lower zone of the flowmeter.

Inside a cell situated under a thick plate 5 is placed a bowl 3 of general cylindrical shape with a convex bottom.

The bowl is equipped with three lateral connection pieces, such that the liquid whose flow is to be measured flows in through one connection piece 6 and flows out of the other connection piece 7, the third connection piece 8 serving to ventilate the apparatus and if necessary to collect any leaks. The corresponding pipes (not shown) are welded to said connection pieces. The plate 5 comprises an opening corresponding to the top opening of the bowl.

Inside said bowl is placed the body 9 of the flowmeter, which body has the shape of a cylindrical box topped with a cover 25 and having a flat bearing surface compressing the joint 13 to achieve tightness.

The body 9 comprises a calibrated orifice 10 at its upper part and a side orifice 11.

Said body has two horizontal walls:
a perforated grid 15, and
a metallic diaphragm 16 fixed in tight manner on the inner wall of the body.

In line with the axis of the apparatus, a tube 17, also called a pin, slides with play in the orifice 10 and in the central hole 31 of the grid. The metallic diaphragm, on the contrary is fixed to the pin outer wall (on a small reinforcing shoulder 18). The upper part 23 of the pin is solid, with the exception of hollowed area designed to receive a magnetic mass 22.

On the upper part of the body and around the cover 25, is fixed a protection hood 24 which is itself topped by a plug 28. Said plug, which is made either of cast iron, lead, or steel (or of a combination of these) achieves a biological protection where the plate is perforated. A series of lugs 29 (only one is shown in the figure) holds the plug in position. The plug is removed by means of lifting rings 30 (only one is shown in the figure).

A series of windings are placed in the hood 24, around the cover 25, the wires of which windings project out through the stuffing box 27. Any leaks occurring are collected in the circular groove 32 and sent through the channel 12 to the nozzle 8.

The plays existing between the parts have been deliberately exaggerated in the figure for better comprehension. A metallic segment 14 (either single or multiple) ensures tightness.

In order to create a restoring force and at the same time to center the pin, there is provided a series of spokes 21 joining in flexible manner the base of the pin to the base of the flowmeter body.

It should also be noted that the liquid from zone "a" can be admitted into the pin through the lower orifice 19 and can flow out in zone "d" through orifice 20.

According to the drawing, the inside of the apparatus comprises four zones:

zone a: liquid flowing in, pressure $P_o$, called upstream pressure, zone b: liquid having flowed through the calibrated orifice while undergoing a pressure drop p, being therefore at a pressure $P_o - p$, zone c: liquid having flowed through the perforated grid where the holes are large enough to make any pressure drop insignificant, zone d: liquid traversing the pin, at a nil flow rate, therefore with the pressure prevailing in zone a, i.e. $P_o$.

OPERATION

The diaphragm, placed between "c" and "d" is therefore subjected to the pressure difference $P_o - (P_o - p) = p$. However, for a given liquid of constant temperature, p is only a function of the flow rate Q through the calibrated orifice 10; the deformation of the diaphragm, or what comes to the same thing, the displacement y of the pin is only a function of p; in consequence, y is only a function of the flow rate Q.

The displacement of the needle (hence the magnetic mass 22) is detected by the three windings 26. This type of detector, which is used according to the invention, and which gives y with a high sensitivity (for example, the displacement is measured to within one micron) is of a conventional type and will not be described here.

It is obviously easy to calibrate the apparatus in such a way that the reading of y gives the corresponding value of Q.

Figure 2:
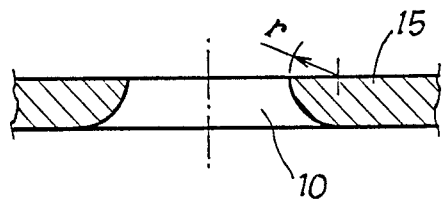
FIG. 2 illustrates a cross-section, on an enlarged scale, of the detail of the calibrated orifice 10, according to a preferred embodiment.

For an improved operation, the calibrated orifice 10 will advantageously be given the shape shown in FIG. 2: the surface of the orifice is a toric surface. If the apparatus is fitted on a conduit, it is possible to know instantaneously the rate of flow of the liquid inside that conduit. The most delicate element of the flowmeter according to the invention is the diaphragm.

A diaphragm tearing, due for example to corrosion or to a sudden surge of pressure, is a frequent occurrence in flowmeters. When working on a radioactive liquid, the tearing of a diaphragm in a conventional flowmeter makes it imperative to stop the flow of liquid immediately in order to avoid the contamination of a large area.

In the flowmeter according to the invention, the tearing of a diaphragm only has one effect, that is the loss of the measurement. Continuity of the circuit, on the other hand, is assured and there is no fear of any leakage. It is not even necessary to provide valves upstream and downstream of the flowmeter.

DISMANTLING

In the case of a faulty operation, after rinsing with streaming water (pure or acid, for example), a protective enclosure (such as described in French Patent Application No. 84 03312 published under No. 2 560 710) is placed around the orifice on top of the plate, then the fastening lugs 29 are unlocked and the plug 28 is removed by means of the lifting rings 30.

The hood 24 is then removed (after unscrewing the screws 33). The working of the sensors 26 can be chacked and, if necessary, said sensors are replaced. If the repair concerns the body proper (and in this case, probably the diaphragm), the screws 33 are replaced by rings and the body is lifted, and can be evacuated through the protective enclosure to a maintenance workshop, or it can be replaced by a new one.

DETAIL OF CONSTRUCTION

Advantageously, the diaphragm used should have been pre-deformed by way of circular waves in order to increase measurement accuracy.

The role of the perforated grid is essentially to prevent the liquid stream flowing from the calibrated orifice from reaching the diaphragm with too high a speed and from dynamically deforming it.

EXAMPLE OF EMBODIMENT

In a stainless steel bowl of 200 mm diameter, is placed a body of inner diameter 130 mm, also in stainless steel.

The diaphragm is in corrugated zircalloy, of serviceable diameter 120 mm, and fixed by crimping on the inner wall of the bowl.

The thickness of the membrane is of 0.5 mm.

The calibrated orifice has a diameter ranging between 32 and 52 mm following a circular shape of 10 mm radius (FIG. 2).

The tightness joint is a Helicoflex joint (Cefilac) in stainless steel, of diameter around 5 mm.

The perforated grid has a thickness of 10 mm and is perforated with three sets of holes of 8 mm diameter, which holes are placed on concentric circles.

The pin is held at its lower part (i.e. in zone "a") by six spokes in stainless steel of 0.5 mm diameter, which spokes are pre-bent to allow elongation. The outer diameter of the pin is 16 mm while its inner diameter is 8 mm.

It is understood that the free passage in the calibrated orifice is about 6 $cm^2$, this causing a pressure drop of 1 m of water, i.e. 100 mbar for a rate of flow of 10 $m^3$/hr.

The force applied to the diaphragm for a pressure difference of 100 mbar is close to 150N and causes a displacement of the pin of 10 mm.

I claim:

1. A flowmeter for dangerous fluids, using the deformation, under the effect of a pressure variation on opposite sides of a resilient, deformable diaphragm, which pressure variation is caused by a liquid flow, said flowmeter being placed behind a protective plate, wherein said flowmeter is comprised of:

a substantially hollow bowl secured to said protective plate and having a lower inlet connection piece for receiving fluid from a first conduit and an upper outlet connection piece for ultimately delivering fluid entering said bowl to a second conduit;

a substantially hollow, substantially cylindrical-shaped inner body fixedly secured between said protective plate and said bowl and defining a hollow interior region between the exterior of said inner body and the interior of said bowl;

barrier means provided in said hollow interior region and dividing said interior region into upper and lower regions for preventing fluid flow from said inlet connection piece directly to said outlet connection piece through said hollow interior region;

said inlet connection piece communicating said first conduit with said lower interior region;

said outlet connection piece communicating said second conduit with said upper interior region;

a resilient metallic diaphragm provided within the interior of said inner body and dividing said interior into first and second compartments;

the lower face of said inner body being provided with a calibrated orifice for introducing fluid into one of said compartments;

the lateral face of said inner body being provided with an outlet opening communicating said one of side compartments with the upper interior region to deliver fluid to said outlet connection piece;

a hollow pin secured to said diaphragm;

the lower end of said pin extending into said calibrated orifice;

detection means having a pin receiving region;

the opposite end of said pin extending into said detection means and being arranged for slidable movement therein;

said hollow pin having an opening in the end extending into said calibrated orifice for receiving fluid introduced into said bowl and having an outlet orifice communicating with the remaining one of said compartments;

the pressure difference on opposite sides of said diaphragm, which is a function of the velocity of the fluid passing through said first and second conduits, displacing said diaphragm to thereby move said pin;

said detection means detecting the displacement of said pin in said pin receiving region to provide an indication of liquid velocity.

2. A flowmeter for dangerous fluids as claimed in claim 1, wherein the metallic diaphragm is of corrugated shape and produced in a corrosion-resistant material.

3. A flowmeter according to claim 2 wherein said diaphragm is formed of a zirconium alloy.

4. A flowmeter for dangerous fluids as claimed in claim 1, wherein the hollow pin is fixed in flexible manner at its lower end to said inner body by pre-bent, flexible, metallic spokes.

5. A flowmeter for dangerous fluids as claimed in claim 1, wherein the detection means comprises sensors which are external to the part of the flowmeter through which the liquid flows and can be dismantled without the flow of fluid being interrupted.

6. A flowmeter for dangerous fluids as claimed in claim 1, wherein a grid perforated to define multiple holes is placed in said inner body between the calibrated orifice and the diaphragm.

7. A flowmeter for dangerous fluids as claimed in claim 1, wherein a fluid-tight seal between the bowl and the inner body is achieved by a metallic joint arranged between said bowl and said inner body.

8. A flowmeter for dangerous fluids as claimed in claim 1, wherein the surface of the calibrated orifice is a toric surface.

9. A flowmeter for dangerous fluids as claimed in claim 1 wherein the bowl remains fixed to said first and second conduits whereas said inner body may be removed from said bowl without interrupting fluid flow between said first and second conduits.

10. A flowmeter for dangerous fluids as claimed in claim 9 wherein said protective plate has an opening:
a cover plate removably inserted into said opening and cooperating with said bowl to define a hollow enclosed region;
said cover plate being removable to facilitate removal of said inner body.

11. A flowmeter for dangerous fluids according to claim 1 in which said pin has a substantially constant outer diameter so that the region between said pin and said inlet orifice through which fluid enters is substantially constant over the normal range of movement of said pin.

12. A flowmeter for dangerous fluids as claimed in claim 1 wherein said barrier means comprises one or more metallic segments arranged between said bowl and said inner body.

13. A flowmeter assembly comprising:
a hollow outer housing having inlet and outlet openings for the flow of a liquid therebetween and within the interior of said outer housing;
a hollow inner housing enclosed by and fixed to said outer housing, the exterior of said inner housing and the interior of said outer housing defining a hollow region;
barrier means for dividing said hollow region into upper and lower hollow regions to prevent fluid flow therebetween;
said inlet opening in said outer housing introducing fluid flow into said lower hollow region;
said outlet opening in said outer housing receiving fluid from said upper hollow region;
a flexible, movable diaphragm enclosed by and secured to said inner housing to divide the interior of said inner housing into two compartments;
an elongated pin arranged for reciprocating movement in said inner housing and being secured to said movable diaphragm for movement therewith due to flow of a liquid in one of said compartments;
inlet and outlet openings being provided in said inner housing;
said inlet opening being a calibrated orifice in said inner housing communicating the one of said compartments with said lower hollow region;
said outlet opening in said inner housing communicating the one of said compartments with said upper hollow region;
said pin extending into said inlet opening in said inner housing and having a hollow interior and inlet and outlet openings communicating said pin hollow interior with said hollow region and one of said compartments; and
means for detecting movement of said pin for determining the flow rate of said fluid.

14. The flowmeter of claim 13 further comprising means for resiliently supporting said pin and maintaining said pin substantially centered in said inlet opening.

15. The flowmeter of claim 13 wherein said inlet opening has a toric shape.

16. The flowmeter of claim 11 wherein the surface of said inlet opening is convex.

17. The flowmeter of claim 13 further comprising perforated means in said inner housing for reducing the impact of fluid entering said inner housing upon said diaphragm.

18. A flowmeter for dangerous fluids according to claim 13 comprising protective plate means for shielding personnel from the dangerous fluid whereby the dangerous fluid is on one side of the protective plate means and personnel are on the other side thereof;

said protective plate means being provided with an opening;

said outer housing being supported by said protective plate means on the dangerous fluid side thereof;

a detecting means housing arranged in the opening in said protective plate means for sealing the opening in said protective plate means; and said detecting means including leads extending through said detecting means housing for making the output of the detecting means available on the personnel side of the protective plate means.

19. A flowmeter for dangerous fluids according to claim 18 wherein said detecting means housing is provided with a stuffing box; and wherein said leads extend through said stuffing box.

* * * * *